United States Patent Office.

JOHN McGILL, OF BOSTON, ASSIGNOR TO BENJAMIN S. GOODWIN, OF BOSTON, AND HIRAM WHITNEY, OF WATERTOWN, MASSACHUSETTS.

Letters Patent No. 102,570, dated May 3, 1870.

IMPROVED COMPOUND FOR DRESSING TEXTILE FABRICS

The Schedule referred to in these Letters Patent and making part of the same.

*To all whom it may concern:*

Be it known that I, JOHN McGILL, of Boston, in the county of Suffolk and State of Massachusetts, have invented a new and useful Compound designed to be used for the purpose of Dressing Textile and other Pliable Fabrics and other articles; and I do declare that the following is a full, clear, and exact description of my invention.

The object of my invention is to obtain a marketable compound to be applied to textile fabrics, and other articles, which, while it will impart to them the proper gloss, stiffening, dressing, and finish, will, at the same time, render them non-inflammable. Such a compound is very desirable to be used in ladies' skirts, curtains, and other articles exposed to fire.

To enable others to make and use my invention I will proceed to describe the same, and its application.

Starch, size, and like articles, are now extensively used in the polishing, dressing, and finishing of goods. They impart to such goods a stiffening, polish, and finish which enhances their market value and their appearance, but they do not render them non-inflammable, and many of those goods and articles made with them easily take fire, and thereby the loss of many lives and much property is frequently occasioned.

The salt known in commerce as sulphate of ammonia, applied to goods in a similar manner, renders them non-inflammable, but does not afford a sufficient dressing, polish, and finish, and, therefore, to furnish an article capable of doing so, I mix and make a compound thereof, which, when used and applied in like manner, not only renders the goods susceptible of polish, but non-inflammable, and this all in one operation.

My invention consists in a compound consisting of the salt called sulphate of ammonia, on the one hand, and the articles in common use for dressing, on the other, such as starch, size, and numberless other articles of like use.

To prepare my invention I take a quantity of sulphate of ammonia, and mix the same mechanically with such starch or size, or other matter used for polishing and dressing.

These articles are then applied to the goods by impregnating them with the compound.

For instance, in the use of starch, I may take a quantity of sulphate of ammonia, say one pound, and mix the same with an equal bulk of dry starch.

This compound is applied in the same way that starch is applied to clothes, and, while the starch gives the proper dressing, the salt, acting, causes the goods to be non-inflammable.

This compound may be dissolved in water, and applied to the goods to be dressed in substantially the same manner as starch is applied, and, when dry, a smoothing-iron may be applied and rubbed over the same, and the result is a non-inflammable dressed article.

The advantage obtained from the invention is a marketable standard article, easily applicable for the purposes set forth.

The proportion of the salt to the polishing matter may be varied at pleasure, according to the character of the articles to be dressed and finished.

What I claim, and desire to secure by Letters Patent, is—

1. The compound formed by the mixture of sulphate of ammonia with starch, size, or other articles used for dressing, finishing, polishing, or stiffening goods, substantially as described.

2. The use of said compound, substantially as set forth.

JOHN McGILL.

Witnesses:
G. F. MANSFIELD,
W. H. RUPERT.